US012614158B2

(12) United States Patent
McCauley et al.

(10) Patent No.: US 12,614,158 B2
(45) Date of Patent: Apr. 28, 2026

(54) DIGITAL ASSET CUSTODIAL SYSTEM

(71) Applicant: Anchor Labs, Inc., San Francisco, CA (US)

(72) Inventors: Nathan P. McCauley, San Francisco, CA (US); Diogo Monica, San Francisco, CA (US); Boaz Avital, San Francisco, CA (US); Riyaz D. Faizullabhoy, San Francisco, CA (US); Kristen B. Howard, San Francisco, CA (US); João M. P. Peixoto, San Francisco, CA (US); Viktor P. Stanchev, San Francisco, CA (US)

(73) Assignee: Anchor Labs, Inc., San Francisco, CA (US)

(*) Notice: Subject to any disclaimer, the term of this patent is extended or adjusted under 35 U.S.C. 154(b) by 548 days.

(21) Appl. No.: 16/011,529

(22) Filed: Jun. 18, 2018

(65) Prior Publication Data

US 2019/0266576 A1 Aug. 29, 2019

Related U.S. Application Data

(60) Provisional application No. 62/640,429, filed on Mar. 8, 2018, provisional application No. 62/636,106, filed on Feb. 27, 2018.

(51) Int. Cl.
*G06Q 20/06* (2012.01)
*G06F 21/32* (2013.01)
(Continued)

(52) U.S. Cl.
CPC ........... *G06Q 20/065* (2013.01); *G06F 21/32* (2013.01); *G06F 21/645* (2013.01);
(Continued)

(58) Field of Classification Search
CPC ............. G06Q 20/065; G06Q 20/3829; G06Q 20/40145; G06Q 20/42; G06Q 2220/00;
(Continued)

(56) References Cited

U.S. PATENT DOCUMENTS 6,950,523 B1 9/2005 Brickell et al.
8,401,968 B1 * 3/2013 Schattauer ............. G06Q 30/06
705/37

(Continued)

FOREIGN PATENT DOCUMENTS

CN 107533501 A 1/2018
JP 2008130052 A * 6/2008 ............. G06Q 50/00
(Continued)

OTHER PUBLICATIONS

"Transaction Immutability and Reputation Traceability: Blockchain as a Platform for Access-controlled IoT and Human Interactivity"; David W. Kravitz; 2017 15th Annual Conference on Privacy, Security and Trust; (Year: 2017).*
(Continued)

*Primary Examiner* — John W Hayes
*Assistant Examiner* — Edgar R. Martinez-Hernandez
(74) *Attorney, Agent, or Firm* — Bookoff McAndrews, PLLC

(57) ABSTRACT

A digital asset custodial system for maintaining custody of, and controlling access to, cryptocurrencies and/or other digital assets, is disclosed. The digital asset custodial system includes multiple layers of security to enable large volumes of digital assets to be maintained in a secure manner. The digital asset custodial system can include a combination of biometric-based multi-user validation, transaction risk analysis, and a hardware security module (HSM) that provides authentication/validation functionality and secure storage of private keys of digital assets.

24 Claims, 8 Drawing Sheets

(51) Int. Cl.

| | | |
|---|---|---|
| *G06F 21/64* | (2013.01) | |
| *G06Q 20/38* | (2012.01) | |
| *G06Q 20/40* | (2012.01) | |
| *G06Q 20/42* | (2012.01) | |
| *H04L 9/00* | (2022.01) | |
| *H04L 9/32* | (2006.01) | |
| *H04L 9/40* | (2022.01) | |
| *H04W 12/069* | (2021.01) | |

(52) U.S. Cl.
CPC ... *G06Q 20/3829* (2013.01); *G06Q 20/40145* (2013.01); *G06Q 20/42* (2013.01); *H04L 9/3236* (2013.01); *H04L 63/126* (2013.01); *G06Q 2220/00* (2013.01); *H04L 9/50* (2022.05); *H04L 2209/56* (2013.01); *H04W 12/069* (2021.01)

(58) Field of Classification Search
CPC ..... G06F 21/32; G06F 21/645; H04L 63/126; H04L 9/3236; H04L 2209/38; H04L 2209/56; H04W 12/069
See application file for complete search history.

(56) References Cited

U.S. PATENT DOCUMENTS

| | | | |
|---|---|---|---|
| 9,892,460 B1 | 2/2018 | Winklevoss et al. | |
| 9,916,581 B2 | 3/2018 | Dorsey et al. | |
| 9,942,211 B1* | 4/2018 | Campagna | H04L 63/062 |
| 10,068,228 B1 | 9/2018 | Winklevoss et al. | |
| 10,373,158 B1 | 8/2019 | James et al. | |
| 10,439,811 B2 | 10/2019 | Norton | |
| 10,523,716 B1* | 12/2019 | Stickle | H04L 41/28 |
| 10,693,638 B1* | 6/2020 | Cignetti | G06F 21/602 |
| 10,937,069 B2* | 3/2021 | Narasimhan | G06Q 30/0279 |
| 2004/0128504 A1 | 7/2004 | Kivinen | |
| 2004/0236694 A1 | 11/2004 | Tattan | |
| 2005/0273442 A1 | 12/2005 | Bennett | |
| 2007/0282756 A1* | 12/2007 | Dravenstott | G06Q 20/40 705/72 |
| 2008/0031460 A1 | 2/2008 | Brookner et al. | |
| 2008/0208758 A1* | 8/2008 | Spiker | G07F 7/1016 705/73 |
| 2008/0285939 A1* | 11/2008 | Baum | G11B 27/034 386/281 |
| 2008/0313226 A1* | 12/2008 | Bowden | G06Q 10/10 |
| 2009/0228707 A1* | 9/2009 | Linsky | H04L 63/1475 380/283 |
| 2010/0024017 A1 | 1/2010 | Ashfield et al. | |
| 2010/0119061 A1 | 5/2010 | Kawale | |
| 2011/0106707 A1* | 5/2011 | Hwang | G06Q 20/28 705/44 |
| 2011/0154025 A1 | 6/2011 | Spalka | |
| 2012/0192260 A1 | 7/2012 | Kontsevich | |
| 2014/0040051 A1* | 2/2014 | Ovick | G07G 3/003 705/16 |
| 2014/0046842 A1 | 2/2014 | Irudayam | |
| 2014/0156534 A1 | 6/2014 | Quigley et al. | |
| 2014/0289528 A1* | 9/2014 | Baghdasaryan | H04L 9/3297 713/171 |
| 2015/0154584 A1* | 6/2015 | Prashant | G06Q 20/24 705/44 |
| 2015/0170112 A1 | 6/2015 | DeCastro | |
| 2015/0287026 A1 | 10/2015 | Yang et al. | |
| 2015/0363778 A1* | 12/2015 | Ronca | G06Q 20/4016 705/71 |
| 2015/0373122 A1 | 12/2015 | Steel et al. | |
| 2015/0381602 A1* | 12/2015 | Grim | H04W 12/30 726/4 |
| 2016/0162897 A1* | 6/2016 | Feeney | H04L 9/3236 705/71 |
| 2016/0189134 A1 | 6/2016 | Voege et al. | |
| 2016/0283920 A1 | 9/2016 | Fisher et al. | |

| | | | |
|---|---|---|---|
| 2016/0285872 A1 | 9/2016 | Polar | |
| 2017/0006018 A1 | 1/2017 | Campagna | |
| 2017/0076518 A1* | 3/2017 | Patterson | G07C 9/22 |
| 2017/0103385 A1* | 4/2017 | Wilson, Jr. | G06Q 20/3825 |
| 2017/0154331 A1 | 6/2017 | Voorhees | |
| 2017/0230375 A1 | 8/2017 | Kurian | |
| 2017/0250972 A1* | 8/2017 | Ronda | H04L 9/0891 |
| 2017/0373849 A1 | 12/2017 | Donner et al. | |
| 2017/0374033 A1 | 12/2017 | Kovacs | |
| 2018/0004930 A1* | 1/2018 | Csinger | H04L 63/0853 |
| 2018/0034800 A1* | 2/2018 | Pistauer | H04L 63/0807 |
| 2018/0075536 A1* | 3/2018 | Jayaram | G06Q 20/26 |
| 2018/0130158 A1 | 5/2018 | Atkinson et al. | |
| 2018/0181737 A1 | 6/2018 | Tussy | |
| 2018/0189100 A1* | 7/2018 | Nemoto | G06F 9/4831 |
| 2018/0330342 A1* | 11/2018 | Prakash | H04L 9/50 |
| 2018/0335928 A1* | 11/2018 | Van Os | G06Q 20/204 |
| 2018/0349909 A1* | 12/2018 | Allen | G06Q 20/40145 |
| 2018/0367311 A1 | 12/2018 | Stahlberg | |
| 2018/0367316 A1 | 12/2018 | Cheng et al. | |
| 2019/0034920 A1* | 1/2019 | Nolan | H04L 9/50 |
| 2019/0036678 A1* | 1/2019 | Ahmed | H04L 9/008 |
| 2019/0043022 A1 | 2/2019 | Fosmark et al. | |
| 2019/0081796 A1* | 3/2019 | Chow | G06Q 20/34 |
| 2019/0164156 A1* | 5/2019 | Lindemann | H04L 63/0861 |
| 2019/0197513 A1* | 6/2019 | Rodriguez | G06Q 20/3572 |
| 2019/0207915 A1 | 7/2019 | Schaap | |
| 2019/0236594 A1 | 8/2019 | Ehrloch-Quinn et al. | |
| 2019/0251524 A1 | 8/2019 | Sadrizadeh et al. | |
| 2019/0268165 A1 | 8/2019 | Monica et al. | |
| 2019/0305956 A1 | 10/2019 | Irani, III | |
| 2019/0347666 A1 | 11/2019 | Bermudez-Cisneros et al. | |
| 2019/0356491 A1 | 11/2019 | Herder, III et al. | |
| 2019/0372779 A1 | 12/2019 | Monica et al. | |
| 2020/0167338 A1 | 5/2020 | Brock et al. | |
| 2020/0266997 A1 | 8/2020 | Monica et al. | |
| 2020/0320488 A1* | 10/2020 | Feng | H04L 9/0637 |
| 2020/0380523 A1 | 12/2020 | Agrawal et al. | |

FOREIGN PATENT DOCUMENTS

| | | | | |
|---|---|---|---|---|
| WO | WO 2019/168792 | | 9/2019 | |
| WO | WO-2022027026 A1 * | 2/2022 | | H04L 63/20 |

OTHER PUBLICATIONS

"An Endorsement-based Mobile Payment System for a Disaster Area"; Babatunde Ojetunde, Naoki Shibata, Juntao Gao, Minoru Ito; 2015 IEEE 29th International Conference on Advanced Information Networking and Applications; (Year: 2015).*
"Strengthening SMS-Based Authentication through Usability"; Mohammed AlZomai, Audun Jøsang, Adrian McCullagh, Ernest Foo; 2008 International Symposium on Parallel and Distributed Processing with Applications; (Year: 2008).*
"E-Commerce Trust Metrics and Models"; Daniel W. Manchala; (Year: 2000).*
Anonymous: "Hierarchical Deterministic: Wallets—BIP32", Feb. 2017, Retrieved from the Internet: URL:https://github.com/bitcoin/bips/blob(11b0fa37bee4eac40c3albe059107868$bcc3392/bip-0032.mediawiki [retrieved on Jun. 20, 2018].
Anonymous: "How to properly secure cryptocurrencies exchanges—Ledger", Aug. 2016, Retrieved from the Internet: URL:https://www.ledger.fr/2016/08/08/hcpw-to-properly-secure-cryptocurrencies-exchanges/ [retrieved on Jun. 29, 2018].
International Search Report and Written Opinion in Application No. PCT/US2019/019414, dated May 15, 2019, 12 pages.
International Search Report and Written Opinion in Application No. PCT/US2019/019425, dated May 9, 2019, 12 pages.
Anonymous: "Casp Solution Overview, "and "Installing Casp" Mar. 2019, retrieved from the Internet: URL: https://www.unboundtech.com/docs/CASP/Versions/1.0.1902/CASP User GuideHTML/Content/Products/CASP/CASP_Offering_Description/Solution.htm#/h2 10, 5 pages.
PCT International Search Report and Written Opinion in International Appln. No. PCT/US2020/043882, dated Nov. 2, 2020. 12 pages.

(56) References Cited

OTHER PUBLICATIONS

PCT International Search Report and Written Opinion in International Appln. No. PCT/US2020/045737, dated Nov. 11, 2020. 12 pages.

Sato et al., "General Security Considerations for Cryptoassets Custodians draft-vcgtf-crypto-assets-security-considerations-04," Apr. 2019, retrieved from the Internet: URL:https://tools.ietf.org/html/draft-vegtf-crypto-assets-security-considerations-04, 47 pages.

Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.

Wired.com [online], "Crypto anchors' might stop the next Equifax-style megabreach," Oct. 11, 2017, retrieved from: URLhttps://www.wired.com/story/crypto-anchors-breach-security/>, 11 pages.

U.S. Appl. No. 16/276,567, Monica et al.

Monica, "Crypto Anchors: Exfiltration Resistant Infrastructure," 11 pages, dated Oct. 8, 2017.

Monica, "Increasing Attacker Cost Using Immutable Infrastructure," 8 pages, dated Nov. 19, 2016.

Monica, "The two metrics that matter for host security," 6 pages, dated Aug. 31, 2017.

Bonneau et al., "SoK: Research Perspectives and Challenges for Bitcoin and Cryptocurrencies," 2015 IEEE Symposium on Security and Privacy, May 17-21, 2015, San Jose, CA, USA, 104-121.

Liu et al., "Security Analysis of Electronic Payment Protocols Based on Quantum Cryptography," 2017 4th International Conference on Information Science and Control Engineering, Jul. 21-23, 2017, Changsha, China, 1709-1712.

PCT International Search Report and Written Opinion in International Appln. No. PCT/US2020/017411, dated Apr. 15, 2020, 19 pages.

Chinese Office Action with Search report in corresponding Chinese Application No. 201980028214.0, dated Feb. 27, 2024 (13 pages).

* cited by examiner

DIGITAL ASSET CUSTODIAL SYSTEM

This application claims the benefit of U.S. provisional patent application No. 62/636,106 filed on Feb. 27, 2018, and U.S. provisional patent application No. 62/640,429 filed on Mar. 8, 2018, each of which is incorporated by reference herein in its entirety.

FIELD

At least one embodiment of the present disclosure pertains to computer systems, and more particularly, to a computer-implemented system for maintaining custody of digital assets, such as cryptocurrencies.

BACKGROUND

Cryptocurrencies such as Bitcoin, Ethereum, Ripple and others have gained in popularity and value in recent years and are expected by many to continue to do so. Every day an increasing variety of transactions are conducted based on cryptocurrencies, and it is conceivable that new types of cryptographic assets may be created in the future, i.e., cryptographic assets that are not necessarily currencies.

With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" are sometimes used to store cryptocurrency, however, those devices limit access only to the owner of the device and are therefore not suitable for many business uses, where a number of individuals may require access to cryptographic funds or other cryptoassets.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
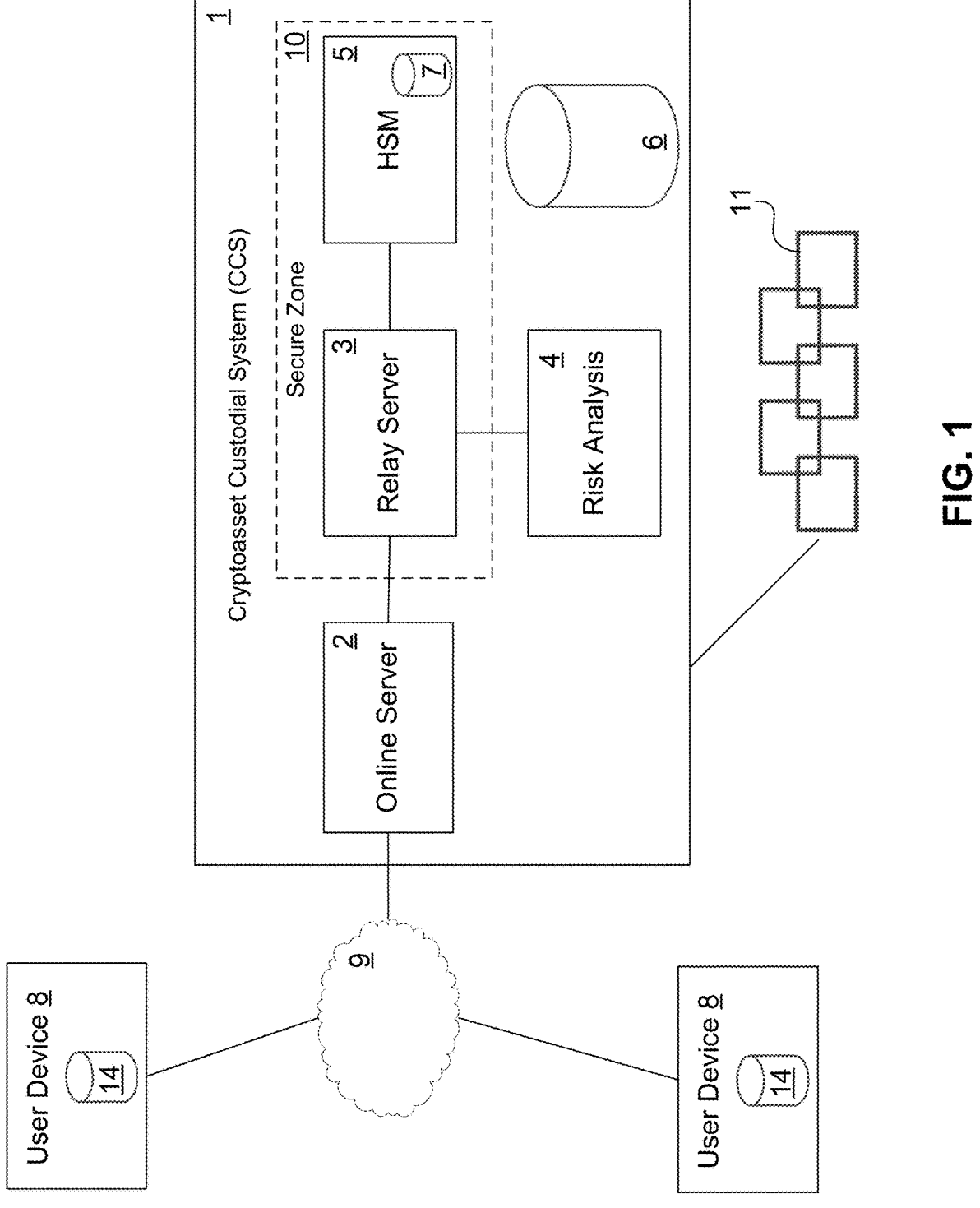
FIG. 1 is a high-level block diagram of a cryptoasset custodial system (CCS).

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Overview

Introduced here is a computer-implemented cryptoasset custodial system (CCS), i.e., a computer-implemented system for maintaining custody of, and controlling access to, cryptocurrencies and/or other cryptoassets. The CCS may be owned and/or operated by a business enterprise, referred to herein as the Cryptoasset Custodian. The CCS includes multiple layers of security so as to enable large volumes of cryptoassets to be maintained in a secure manner. In certain embodiments the CCS includes a combination of biometric-based multi-user validation, transaction risk analysis, and use of a hardware security module (HSM) to provide authentication/validation functionality and secure storage of private keys of cryptoassets. Furthermore, two or more different biometric authentication techniques may be applied to any given transaction request. As used herein, the term "hardware security module" or "HSM" refers to a special-purpose physical computing device that safeguards and manages digital keys for authentication and provides cryptoprocessing functionality. The HSM can be embodied as a plug-in card or an external device that attaches directly to a computer.

In certain embodiments, when a user requests a transaction involving a cryptoasset, such as a withdrawal of transfer of cryptocurrency funds, the CCS causes an endorsement request message to be sent to each of multiple user devices, each of which is associated with a different user who has been defined as potential member of a quorum for transactions involving that cryptoasset (in other embodiments, multiple users may share the same user device). The endorsement request message is configured to cause each receiving user device to prompt its user to provide an endorsement of the requested transaction. An endorsement in this context is an approval or rejection of an operation by a user. When a user receiving such a prompt endorses the transaction on his or her user device (e.g., a smartphone, tablet or notebook computer), the user device signs an endorsement message with a private key of that user and transmits the signed endorsement message to the CCS. The private key is stored within a secure enclave within the user device. A secure enclave in each user device is used to store the corresponding user's private key and to generate digital signatures of that user.

The HSM determines whether a policy-based quorum of multiple users has endorsed (approved) a requested action, such as a withdrawal or transfer of cryptocurrency funds. It does this by validating the signature by a public key of a public-private key pair for each of the plurality of users, in endorsement messages received from the users. Only after determining that the policy-based quorum of the multiple users has validly endorsed the requested action, the HSM then allows itself to access the private key of that particular cryptographic asset (e.g., for a specific deposit of cryptocurrency funds), which the HSM previously generated, and uses that private key to sign the transaction as authorization that the transaction may proceed. The private key for that cryptoasset is stored only in the HSM, which does not permit the key to be read by any entity outside the HSM. Approval of the transaction may include, for example, transmitting the transaction onto a known blockchain network. In certain embodiments, approval of the transaction by the HSM occurs only if and after the requested transaction has passed a risk review, which may be partially or fully automated. Other details will become apparent from the description that follows. Note also that it is contemplated the system and techniques introduced here can be used for secure custody of other types of digital assets besides cryptoassets.

Refer now to FIG. 1, which shows a high-level block diagram of the CCS. In the illustrated embodiment, the CCS 1 includes an online server 2, a relay server 3, a risk analysis stage 4, the HSM 5, and a data storage facility 6. The data storage facility 6 may include one or more databases, which can be or include relational databases or any other type of mechanism for storing data in an organized way, where the data may be structured data and/or unstructured data. The HSM 5 also includes its own internal secure storage facility 7. Note that there can be multiple instances of each of the above-mentioned components in the CCS 1, even though only one of each is shown to simplify description. One or more user devices 8, also called clients, can communicate with the CCS 1 via a public computer network 9, such as the Internet. Each of the user devices may be any one of, for example, a smartphone, tablet computer, laptop computer, desktop computer, or the like. Each user device 8 may include a secure enclave 14, such as an iOS-based secure enclave, which is used to store the corresponding user's private key and to generate digital signatures of that user. In at least some embodiments, each user device 8 is associated with a different user, and this description henceforth assumes such an embodiment to facilitate description. Note, however, that it is possible to have embodiments in which multiple users share the same user device 8.

The relay server 3 functions as a virtual air gap to isolate the HSM 5 from the public computer network 9. The relay server 4 and HSM 5 operate within a secure zone 10. The HSM 5 may physically reside in a physically secured datacenter with no direct access to any outside network. Messages between the HSM 5 and the online server 2 are routed on a half-duplex (outbound request-responses only) connection to the relay server 3 in the secure zone 10. The relay server 3 disconnects itself from the secure network while communicating with the online server 1, and disconnects itself from all external networks while communicating with the HSM 5, such that no interactive sessions with those devices can be established from the outside. This provides virtual "air gap" security to critical infrastructure.

In certain embodiments, the CCS 1 also has access to at least one blockchain network 11 corresponding to a cryptoassets of which the CCS 1 has custody. Access to the blockchain network 11 may be via the public computer network 9, e.g., the Internet.

In some embodiments, each transaction submitted by a customer of the CCS 1 will go through the risk analysis stage 4, which may be partially or fully automated. For example, with some embodiments of the CCS 1, a human risk analysis agent may evaluate the output of automated risk analysis software displayed on a risk review dashboard, to make a decision on whether a transaction has been sufficiently authorized to be accepted. The risk analysis agent or the software can follow a policy set on each individual vault and can look at any of various risk signals (e.g., the amount being transacted, how many users have authorized this transaction, the location(s) from which the transaction was requested and approved, the destination address) to compute a final risk score that might lead to the transaction being approved or more information being requested.

Deposits

Figure 2A:
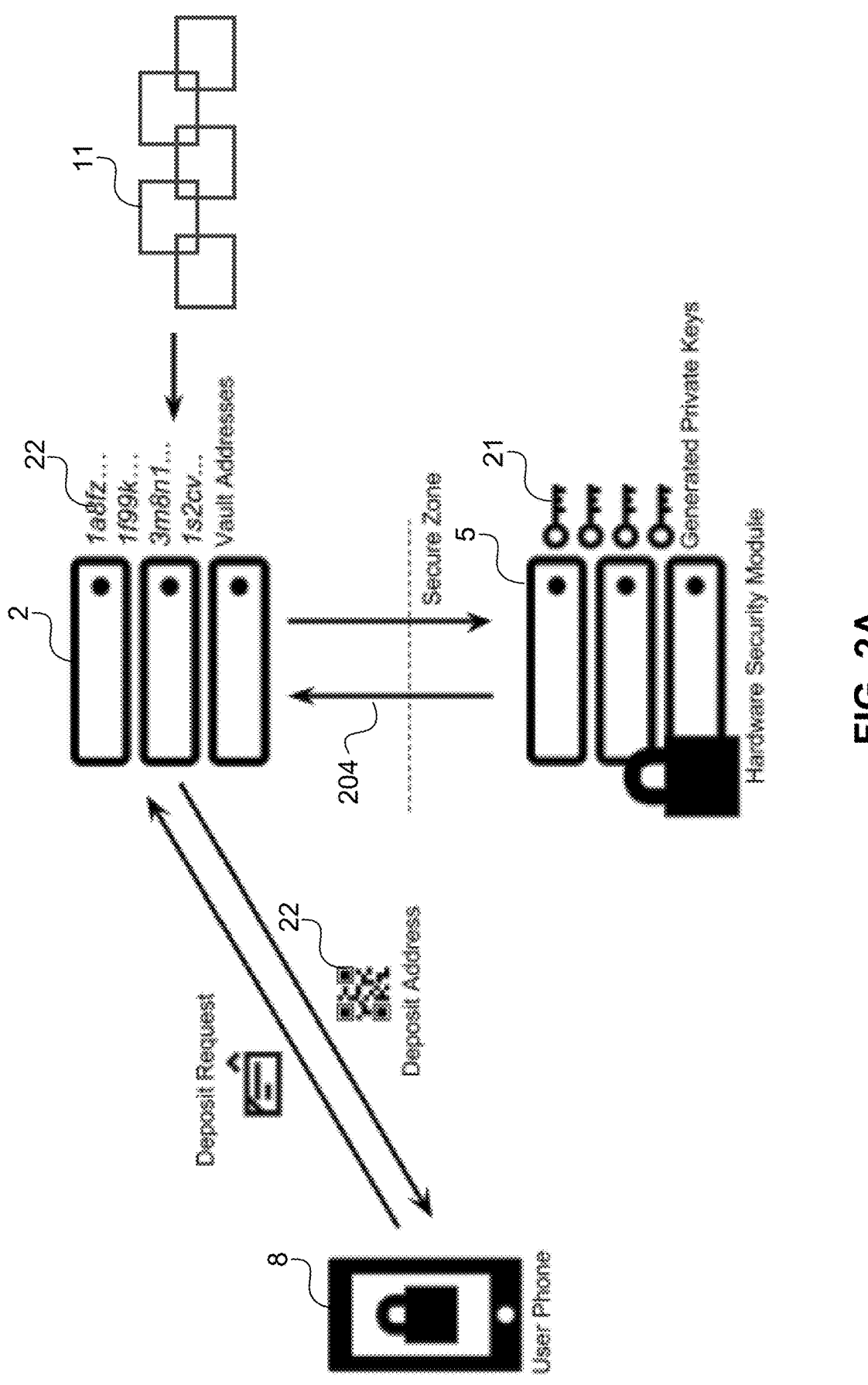
FIG. 2A is a schematic diagram illustrating an example of a deposit process flow with the CCS.
Figure 2B:
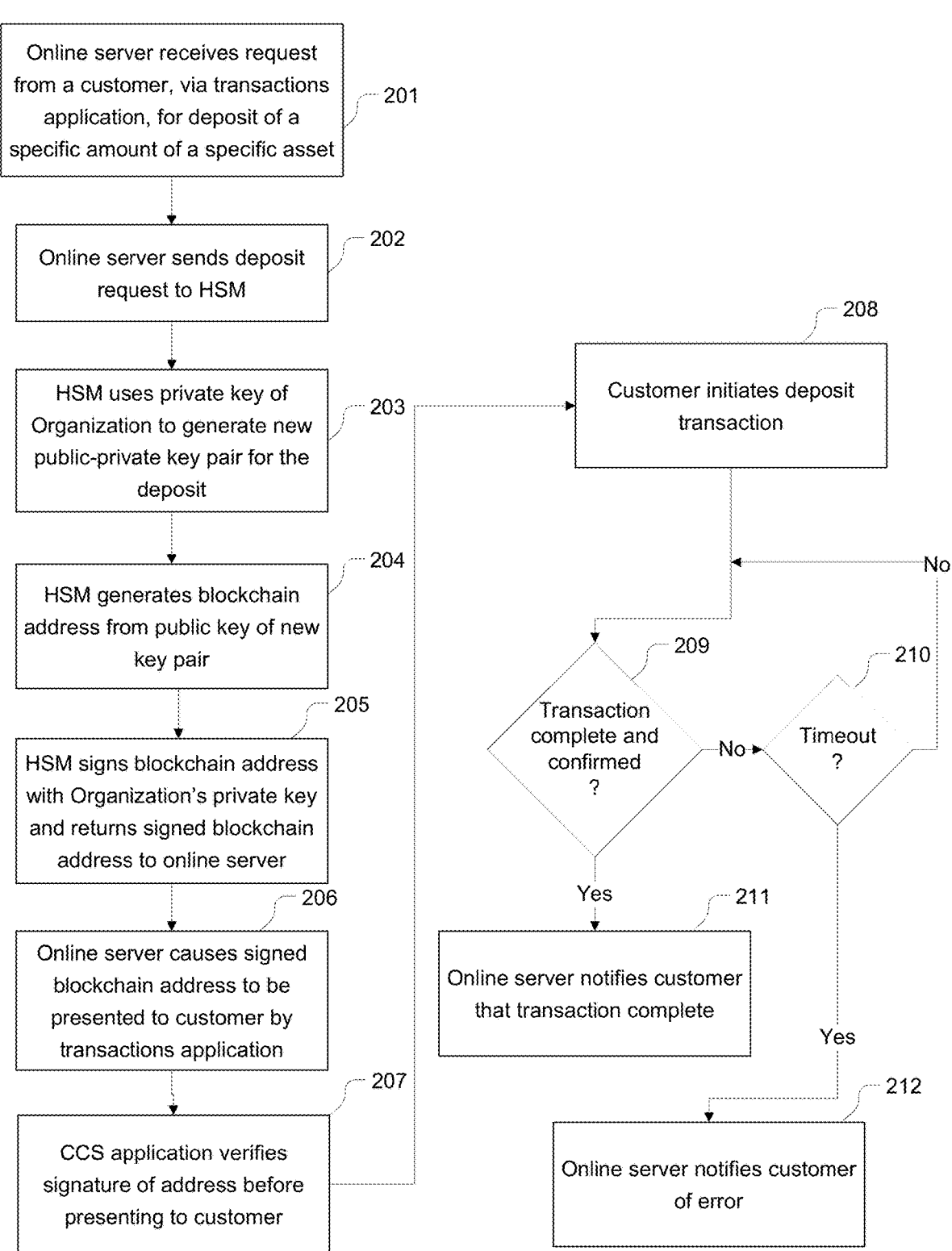
FIG. 2B is a flow diagram illustrating an example of the deposit process flow.

Refer now to FIGS. 2A and 2B, which illustrate an example of the process of depositing a cryptoasset, such as an amount of cryptocurrencies, with the CCS 1. Deposits are initiated by a customer via the Internet through a software application (hereinafter "the CCS application")(not shown) executing on a user device 8 of the customer. This can be done by the customer's selecting an asset type and requesting a deposit for a given amount in the CCS application. Once initiated, the request for a blockchain deposit address is then sent to the online server 2, which receives the request (step 201) and forwards it (step 202) via the relay server 3 to the HSM 5 (which as noted above is isolated from the Internet by the relay server 3). The HSM 5 then generates (step 203) a new public-private key pair 21 to correspond uniquely with the deposit, i.e., to correspond with the requested blockchain address. In certain embodiments, the HSM 5 uses the private key of the relevant Organization and a key derivation function (KDF) to generate the new key pair for the blockchain address. An "Organization" in this context is a data structure that corresponds to a particular customer, as discussed further below. The private key of the newly generated key pair cannot be extracted from the HSM 5, but can be backed up securely in an encrypted file. Key generation inside the HSM 5 ensures that the private keys 21 only exist within the HSM 5, are not available anywhere else in the world and cannot be accessed by any entity that is external to the HSM 5.

The HSM 5 next generates (step 204) the blockchain address for the deposit from the public key of the newly-created key pair. This can be done by using a well-known blockchain-specific transformation of the public key of the blockchain address. The HSM 5 then signs (step 205) the blockchain address with the Organization's private key and returns the signed blockchain address to the online server 2. The online server 2 then causes (step 206) the signed blockchain address 22 to be sent to the customer's user device 8, to cause the user device 8 to present the address to the customer in the CCS application on a user device, in an easy-to-consume format (e.g., as a QR code), for use as a destination address in a blockchain transaction. The CCS application on the user device verifies (step 207) the signature of the address before presenting the address to customer.

The customer's user device 8 uses the public key of the Organization (which it previously received from the CCS 1 and locally stored) to verify the authenticity of the blockchain address it receives from the CCS 1. The customer then initiates (step 208) a transaction to deposit assets into the CCS 1. The transaction might be initiated from an exchange, from the customer's personal wallet, or from another cryptoasset store. No confirmation is required for the assets to show up in the CCS 1.

The address of the deposit is stored in a collection with other addresses belonging to the customer in the CCS 1, known as the customer's "vault." A vault in this context is a data entity that contains assets and a policy map containing one or more policies governing deposits and withdrawals from those assets. A cryptoasset is represented as a slot inside a vault that can hold an amount of an asset type (e.g., Bitcoin, Ethereum). Once under custody and stored with the CCS 1, an asset is completely under the control of the CCS 1.

The online server 2 determines whether the customer has confirmed the transaction within the defined time period (steps 209, 210). Once the deposit transaction is confirmed by customer and confirmed on the blockchain, the customer is so notified (step 211) by the online server 2, and the assets are considered to be under custody of the CCS 1. In the event confirmation is not received within the defined time period, the online server notifies (step 212) the customer of an error in the transaction.

Withdrawals

Figure 3A:
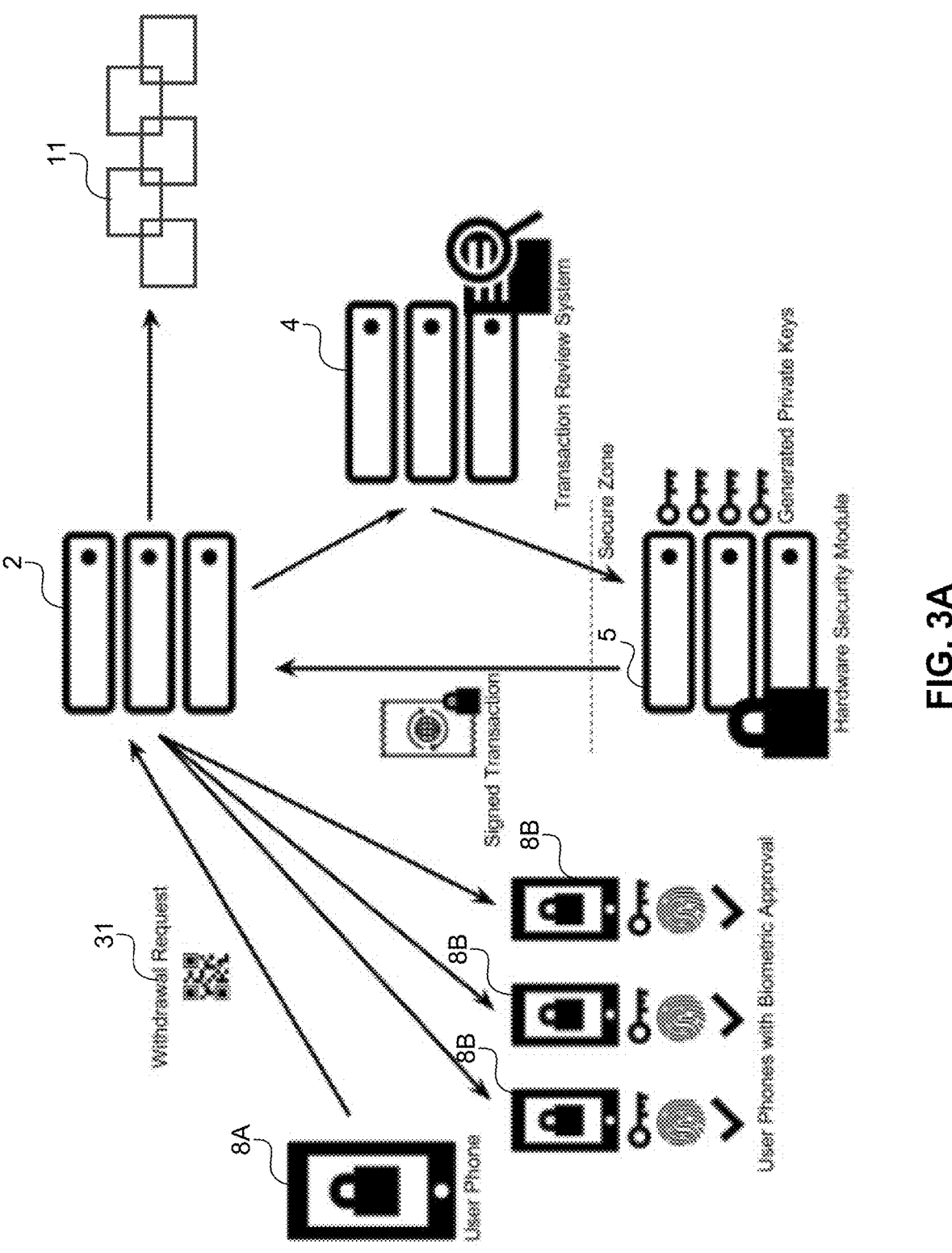
FIG. 3A is a schematic diagram illustrating an example of a withdrawal process flow with the CCS.
Figure 3B:
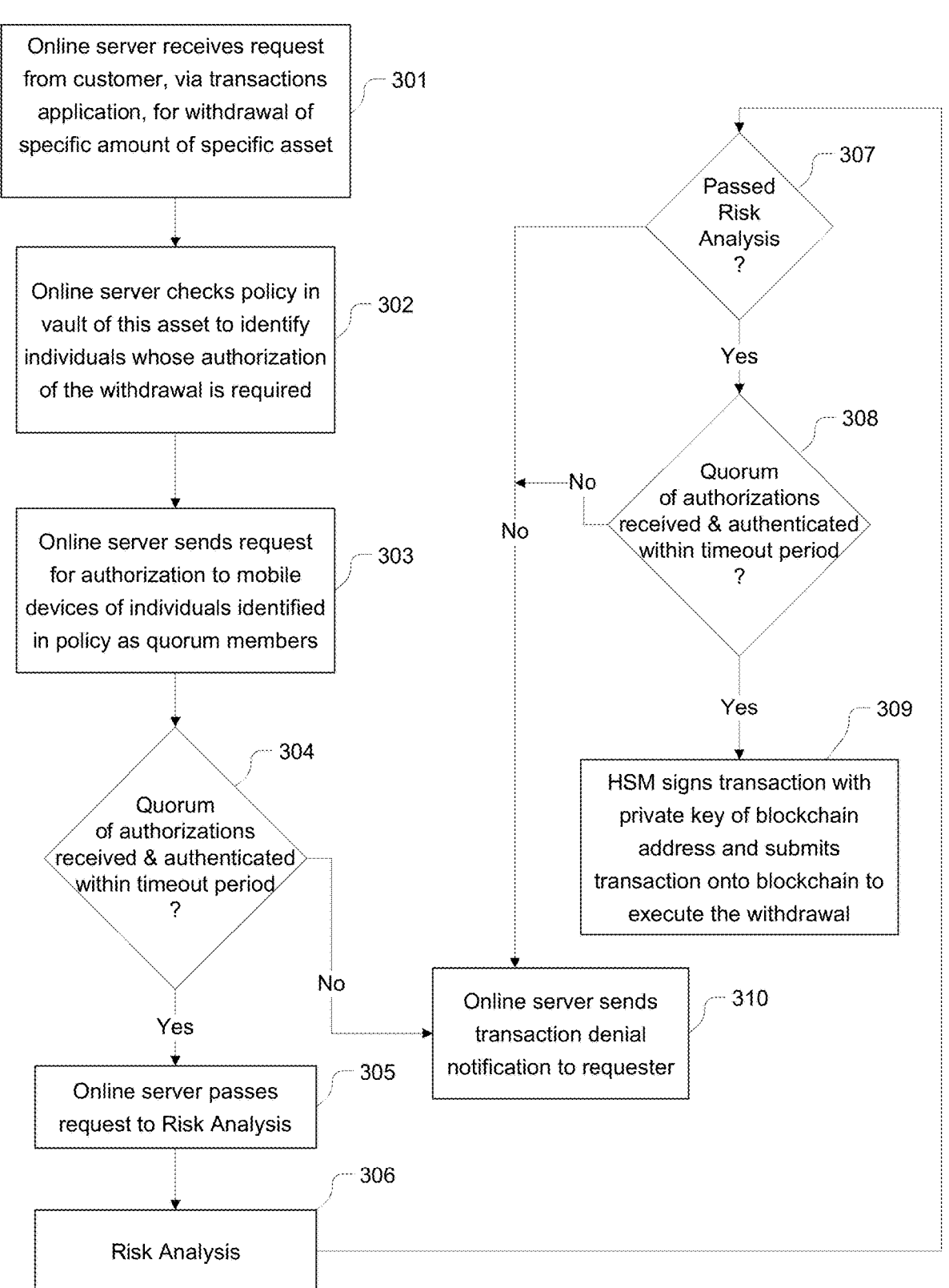
FIG. 3B is a flow diagram illustrating an example of the withdrawal process flow.

FIGS. 3A and 3B illustrate an example of the process of withdrawing an amount of a previously deposited cryptoasset, such as cryptocurrency. Withdrawals can be initiated from the CCS application on a user device 8A by selecting a specific cryptoasset to withdraw and an amount. Once initiated, all authorizing parties are made aware of the withdrawal request and are required to authorize it individually on their mobile devices 8A and 8B.

During this process users are required to review the transaction and approve it, where each user's approval is subject to biometric authentication (e.g., fingerprint, facial recognition and/or voice recognition). In certain embodiments, before a withdrawal can successfully move on to the next phase, every request is sent to the risk analysis stage to be inspected for suspicious activity and authorized as legitimate. The HSM 5 validates that a defined quorum (e.g., a majority) of users authorized the transaction, and that the transaction was approved by the risk review stage 4. For example, for a given corporate customer that has five distinct employees who require the ability to transfer funds, a suitable quorum configuration might be to have a group of three of those five employees be necessary to move any funds. The HSM 1 then proceeds with the signature and submission of the asset-moving transaction to the blockchain 11.

An example of the withdrawal process is further illustrated in FIG. 3B. The online server 2 initially receives (step 301) the withdrawal request 31 from the customer. The online server 2 then checks (step 305) the approval policy for the cryptoasset that is the subject of the transaction, as indicated in the vault of the cryptoasset, to determine which individuals' authorizations (endorsements) may be used to satisfy a quorum to approve the withdrawal. The online server 2 then sends (step 306) endorsement requests to the mobile devices 8A, 8B of those individuals (the mobile devices have been previously registered with the CCS 1). In response to these requests, one or more endorsement messages may be received from users' mobile devices 8A, 8B, where the endorsement messages were signed locally by the users' respective private keys stored securely in their respective mobile devices and subjected to one or more biometric authentication techniques, as described further below. Accordingly, the online server 2 determines (step 304) whether, within a timeout period, a quorum of authorizations have been received and the corresponding authorizing parties have been authenticated, as specified in the policy for this cryptoasset. If so, the online server 2 passes (step 305) the transaction request 31 to the risk analysis stage 4. Otherwise, the online server sends (step 310) a transaction denial notification to at least the user who requested the transaction (and possibly to all other users identified in the policy for this cryptoasset).

The risk analysis stage 4 performs a risk analysis (step 306), which as noted above may be fully or partially automated, or in some embodiments may be performed entirely by one or more human beings (based on computer output data). If the transaction passes risk analysis (step 306), then control flow is passed to the HSM 5, which verifies (step 308) that the quorum requirement has been satisfied, by performing the same determination as step 304 or a similar determination, as does the risk analysis stage 4 (step 306) (described further below). If satisfaction of the quorum is verified by the HSM 5, the HSM signs the withdrawal transaction with the private key of the blockchain address and submits the transaction onto the blockchain 11 to execute the withdrawal (step 309). Otherwise, the HSM 5 signals a failure to the online server 2, which in response sends (step 310) a transaction denial notification to at least the user who requested the transaction (and possibly to all other users identified in the policy for this cryptoasset).

User Authentication

As mentioned above, when a user endorses a transaction request, they are subjected to one or more forms of authentication by their mobile device and/or the CCS 1, to establish that they are the expected person taking the action. These authentication forms may include one or more biometric authentication techniques, such as fingerprint verification, voiceprint verification, speech recognition, facial recognition and/or gesture recognition. The user's mobile device (e.g., smartphone) may perform one or more of these authentication techniques.

Additionally, or alternatively, the user may be required to upload to the CCS 1 a video, captured by their mobile device, from which their identify can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction. These challenges may be generated deterministically based on the context of the transaction. For example, based on critical information in a transaction such as the ID, amount, destination, etc., the CCS 1 may generate a random number that can be used to select a few (e.g., three to five) words from a set of known words. The CCS 1 may present those words to the user and have the user speak them in a video captured by the user's mobile device, which the user's mobile device then transmits to the CCS 1. When reviewing the transaction, the reviewing mechanism or a human reviewer can independently generate the expected words based on transaction data and verify that the user spoke those words. The video can also be subject to facial and/or voice recognition. By performing this type of deterministic challenge generation, an attacker can be prevented from faking a transaction by capturing and reusing previously transmitted authentication videos from the user.

HSM Logic

The main role of the HSM 5 is to verify the validity of operations. The HSM 5 carries out the will of the signers and authenticates that the signers are the authorized parties of an operation through the HSM's privileged access to keys. Keys needed for signing transactions are stored securely in the HSM 5 and never leave it. In some embodiments, the HSM 5 enforces these policies through a Secure Execution Environment (SEE) that runs code that cannot be changed except through physical access to the HSM 5 and requires a set of smartcards held securely by multiple employees of the Cryptoasset Custodian.

In certain embodiments, to facilitate the above-mentioned functionality the HSM 5 stores, in its internal storage 7, multiple instances of a data structure called "Organization,"

i.e., one instance for each customer of the Cryptoasset Custodian. The Organization data structure may contain the following fields: an identifier (ID) of the organization, a name of the organization, a public key of the organization, a list of users who belong to the organization, a policy map, a list of vaults that belong to the organization and their respective policy maps, and a generation number that is incremented each time the organization structure is updated. A "policy map" is a set of policies, including one policy for each possible action that may be carried out (e.g., add user, change vault policy, etc.). An Organization is signed by the HSM, using the Organization's private key (which is stored in the HSM 5 and cannot be read by any external entity), to indicate that it was produced through a valid set of changes authorized by the users and risk reviewers. The HSM keeps track of the most recent version to prevent rollback attacks.

To onboard a new customer, the HSM 5 creates a new Organization instance. To help ensure adequate security, the HSM 5 may create the Organization with the requested set of users already in it. In some embodiments, the HSM 5 must generate new unique keys for every new Organization created this way. This prevents an attacker from asking the HSM 5 to generate a "new" organization that has the same ID as an existing one and tricking users into trusting it instead.

Figure 4:
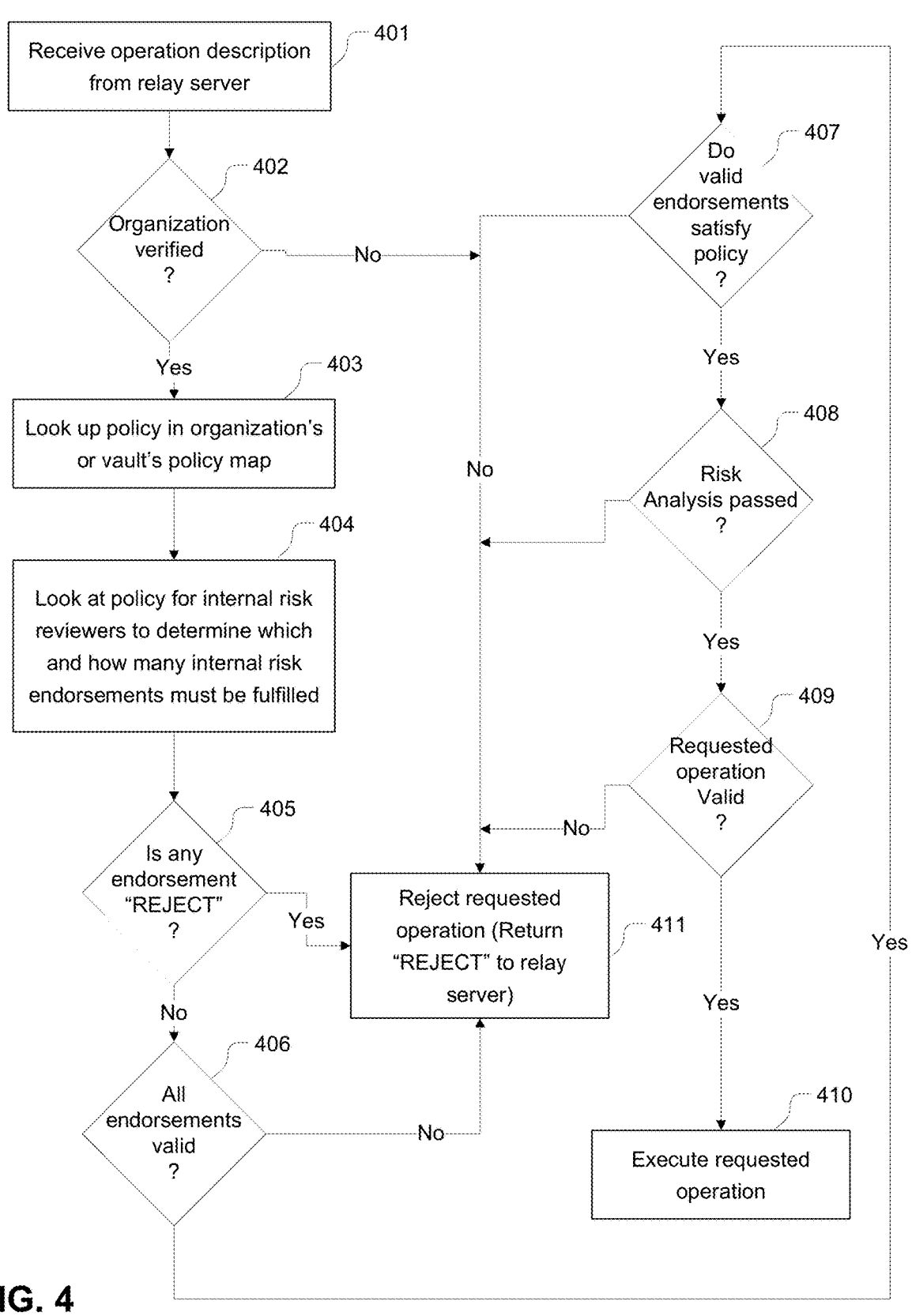
FIG. 4 is a flow diagram illustrating an example of a process performed by the hardware security module (HSM) in connection with a requested operation.

FIG. 4 illustrates an example of a process that may be performed by the HSM 5, in at least some embodiments, in response to a request to carry out an operation. The request may be received by the HSM 5 from the relay server 3. Initially, the HSM 5 receives (step 401) from the relay server 3 an operation description, which specifies an Organization. The operation description is a set of data and metadata describing a requested operation, such as a requested deposit, withdrawal or transfer of cryptocurrency. The HSM 5 then verifies (step 402) the integrity of the specified Organization.

The HSM 5 then looks up the policy in the Organization's or the vault's policy map (step 403). It then looks at the policy for internal risk reviewers to determine which and how many internal risk endorsements (i.e., endorsements by personnel of the Cryptoasset Custodian) must be fulfilled (step 404). Next, the HSM 5 determines (step 405) whether any of the received endorsements (from users) indicates to "REJECT" the requested operation. If so, the HSM 5 rejects (step 411) the requested operation, by returning a "REJECT" message to the relay server, which then returns a corresponding "REJECT" message to the online server, to cause notification to the requester. In this case, the HSM 5 does not bother checking the signatures and just rejects the operation.

The HSM 5 then determines (step 406) whether all of the received endorsements for the transaction are valid. This includes verifying the validity of the endorsements provided by checking that: i) the user is in the Organization, ii) the signature is correct for the specified operation, and iii) each of the signatures has an "APPROVE" decision. If not all of the received endorsements for the transaction are valid, the process proceeds to step 411 as described above.

If all received endorsements for the transaction are valid, the HSM 5 then determines (step 407) whether the endorsements satisfy the relevant policy for the subject cryptoasset (i.e., satisfy the specified quorum). If the valid endorsements do not satisfy the policy, the process proceeds to step 411 as described above. If the endorsements satisfy the policy, then the HSM 5 determines (step 408) whether the requested operation passed the risk analysis stage. If not, the process proceeds to step 411 as described above. If the requested operation passed the risk analysis stage, the HSM 5 determines (step 409) whether the requested operation is valid. This step can include verifying that the operation is internally consistent and that the operation can be applied to the Organization, vault or asset that it targets. If the requested operation is not valid, the process proceeds to step 411 as described above. Otherwise, the HSM 5 executes (step 410) the requested operation (or triggers an action to cause it to be executed). An operation to change the Organization, vault or policy results in a new signed Organization data structure with a higher generation value and the change applied to it. An operation to withdraw assets results in the HSM 5 signing a blockchain transaction with the private key corresponding to the subject asset. An operation to deposit assets results in the HSM 5 generating a deposit address.

Offline Device Endorsements

As a method for reducing the risk for users interacting with the CCS application on their personal devices, the CCS 1 may require authorization from an offline device. This device, such as a consumer phone with secure enclave or similarly capable computing device such as an iPod Touch, will be completely disconnected from the Internet in its normal state, and used in an offline manner to sign transactions required for authorization.

The process may be carried out as follows. The user has a phone or similar device that is a member of his or her vault policy's quorum and is not connected to any wireless or cellular networks. The device runs software similar to the CCS application software for enabling a user to endorse requested transactions, or the same software operating in a different mode. The user initiates a transaction against his or her vault through a different device in the quorum. An online device, such as another phone or web browser, has access to the transaction. It may be another phone/secure device in the quorum or it may exist solely for the purpose of displaying transactions. The device has the ability to transmit data that is required to be signed by the offline device, to the offline device. This can be done through a channel that cannot be accessed over the Internet, such as displaying a QR code, playing a sound or sequence of sounds that encodes data, or transmitting over Bluetooth. The offline device displays the data that was transmitted for it to sign, for the user's approval or rejection. The offline device signs its endorsement of the operation based on the user's desired action. The offline device communicates its signed payload back to the online device in a similar manner to how it was received (e.g., displaying a QR code, playing a sound or sequence of sounds that encodes data, or transmitting over Bluetooth). The online device communicates the signed decision payload back to the online server of the CCS 1.

Figure 5:
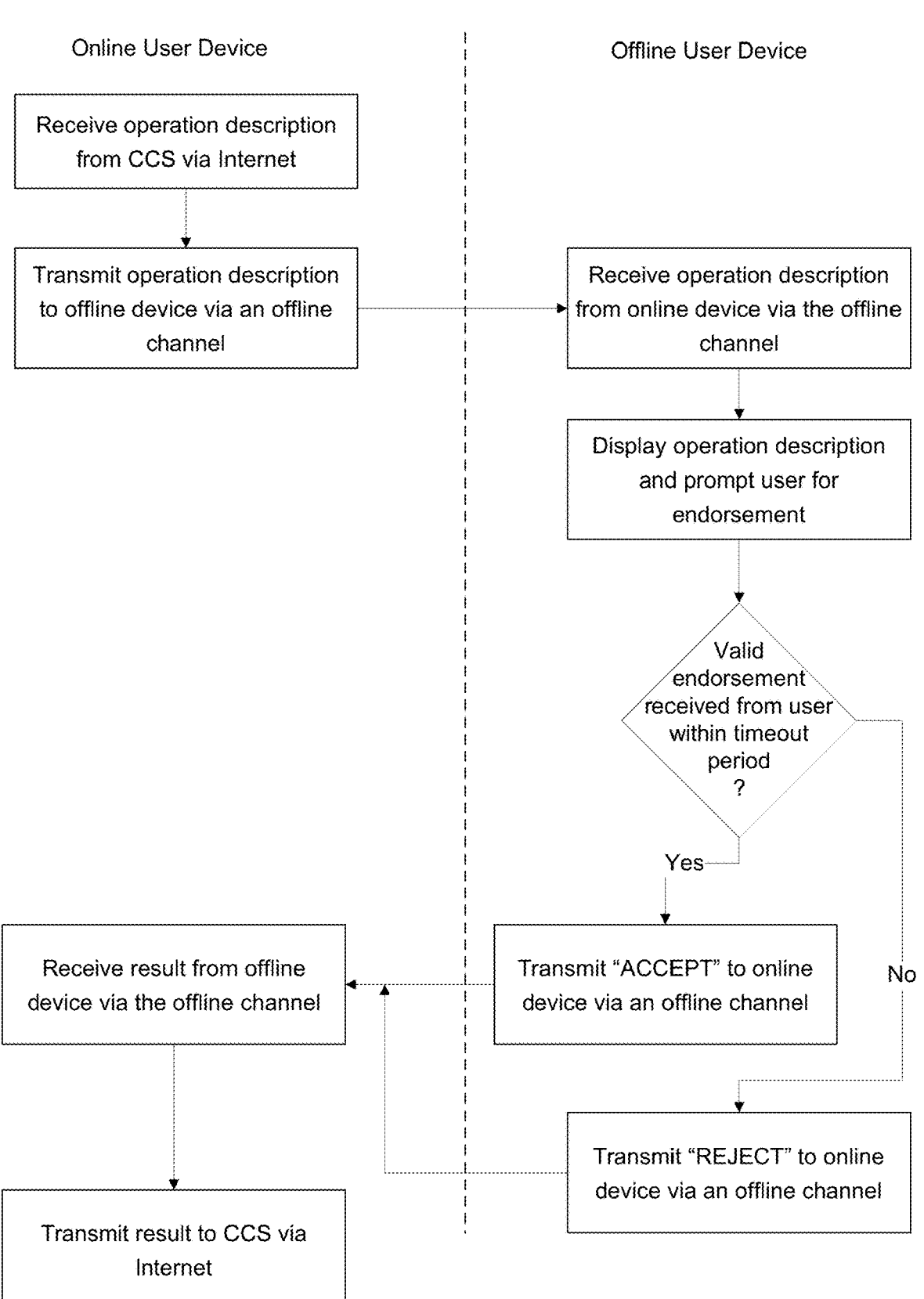
FIG. 5 is a flow diagram illustrating an example of a process for using an offline user device to endorse a requested transaction.

FIG. 5 is a flow diagram that further illustrates this process, according to certain embodiments. An online user device receives (step 501) an operation description from the CCS via the Internet. The online user device then transmits (step 502) the operation description (or a portion thereof) to the offline user device file an offline channel. As noted above, the offline channel is a channel that is not accessible via the Internet, such as a local visual display by the online user device, a sound or sequence of sounds generated by the online user device, or a short range wireless transmission from the online user device (e.g., via Bluetooth). The offline user device receives the operation description (step 503) from the online user device via the offline channel, and based on the information thereby received, displays the operation description (or portion thereof) and prompts the user for endorsement of the operation (step 504). If a valid endorsement is received by the offline device (step 505) as user input within a timeout period, the offline device transmits an "ACCEPT" message (step 506) to the online user device via the same offline channel by which it received the operation description, or via a different offline channel. The online user device then receives the results of the endorsement from the offline device (step 507) and transmits the result payload to the CCS via the Internet (step 508). If a valid endorsement is not received by the offline user device from the user within the timeout period (step 505), the offline user device transmits a "REJECT" message to the online user device via the offline channel, which in turn transmits the "REJECT" payload to the CCS via the Internet (step 508).

The offline device may be delivered to the user with its secure key pre-enrolled in the Organization, or it may be allowed to be online for the initial enrollment process, or it may send its enrollment through a similar procedure to the authorization process.

The CCS software on the offline device may need to be updated periodically. To allow such updates, the offline device may be scheduled to connect to the Internet via Wi-Fi and have its software updated at a predefined cadence, or it may detect that its software needs to be updated as a result of receiving a transaction to sign from the online user device, that indicates that the version of the software on the offline device is no longer compatible. Whenever the device is online, it can record as well as attempt to transmit to the CCS 1 the fact that it can access the Internet so that that information may be used to assess risk by the platform at a later time.

In addition to being kept offline, the offline user device and one or more online devices may be restricted to act on a transaction only when in range of a predefined beacon. A wireless (e.g., Bluetooth) beacon device can be made available to the user, and the CCS application may refuse to authorize transactions unless it detects that the beacon is available.

Auditability and Proof of Ownership

Every transaction submitted to the CCS 1 is recorded in an internal ledger that is tamper-resistant and that allows auditors to have cryptographic proof of every historical event on every user's account. The ownership of a blockchain asset is controlled by the possession of the private key corresponding to the public wallet address. The CCS can prove ownership of these assets to auditors by making use of the private key corresponding to a user's vault to sign a string of randomly chosen text chosen by the auditors. Consider the following example:

An auditor wishes to see proof that the CCS has access to funds in wallet identified by the address, "1BvBMSEYstn5Au4m4GFg7yJaNVN2." The auditor therefore randomly generates a long string, e.g., "xGG8vQFnd8QDwHz6Uj1GX," and submits the following challenge:

```
{
    Address: 1BvBMSEYstn5Au4m4GFg7yJaNVN2 ,
    Token: " AUDIT-CHALLENGE- xGG8vQFnd8QDwHz6Uj1GX",
}
```

The CCS 1 receives the challenge and forwards it to the HSM 5 as a predefined templated serialized package. The HSM 5 is programmed to accept and sign such audit requests (which are not arbitrary payloads and therefore are not at risk of being later interpreted as a signed blockchain transaction) with the private key associated with the specified address. The CCS 1 then returns the valid signature for the challenge that can be independently verified by the auditor. This verification proves that the CCS 1 has control over a private key associated with an entry on the blockchain, achieving proof of control of the asset.

Thresholding Service

In certain embodiments, the CCS 1 includes a Thresholding Service that enables other parts of the system (Risk Analysis stage 4 and HSM 5) to securely determine that user operations and transactions have followed the customer specific business logic and have been approved by a human/automated risk review system. The Thresholding Service can verify multi-signature (multi-user) quorums to achieve this.

The Thresholding Service validates operations initiated and approved by users to ensure that they've met a threshold quorum before being executed. Such operations may include transactions, adding or removing other users, etc. Different users can have different access control roles (e.g., view-only, initiate-transaction-only, authorizable, necessary). The CCS 1 is able to notify every reportable status of the quorum acceptance lifecycle, but is not able to sign-off on operations that have not been authorized by customers. All actions are logged in an append-only ledger for auditability over all account interactions.

One function of the Thresholding Service is to verify that a quorum of authorized users have signed-off on a requested operation. Qualifying operations that may require a quorum may include, for example, proposing a transaction (e.g., "withdraw 100 Bitcoin"), adding a user to an account, changing a user's permissions, removing a user from an account, and changing the thresholding logic. A quorum may be defined as an absolute majority of users by default (e.g., 3 out of 5), or it may be set to a custom quorum upon onboarding of the customer. Moreover, an authorized user can configure a quorum to require certain specific users to endorse a transaction to constitute a quorum. The CCS 1 may also allow thresholding across multiple required groups. For example, in a company a majority of the finance team may be required to sign off, as well as the front office.

In certain embodiments, the Thresholding Service implements a fine-grained access control model in its quorum verification, in which different users can have different access levels, which may include the following levels, for example:

View-only

This is the default access level

Users in this level can view all asset positions

Users in this level can flag any transaction

Users in this level can freeze all assets

View-authorize

Users in this level can act as an authorizing vote for an action toward a quorum Users in this level can view all asset positions Users in this level can flag any transaction Users in this level can freeze all assets View-authorize-necessary Users in this level are a required vote for an action Users in this level can view all asset positions Users in this level can flag any transaction Users in this level can freeze all assets In certain embodiments, the access level for a user can only be changed with an appropriately verified quorum that is verified by the Thresholding Service.

As noted above, user approvals for an action can be expressed by a cryptographic digital signature, to benefit from non-repudiation guarantees. The Cryptoasset Custodian can be certain that the associated user who holds the private key was indeed the user who approved the action, since digital signatures cannot be forged. In certain embodiments, a user's signature is generated from an iOS secure enclave in the user's mobile device, and forwarded to the CCS 1 by the iOS application programming interface (API) component in the user device 8. Signatures can be performed over the cryptographic hash of the transaction contents to ensure that the transaction cannot be tampered with. All users may be required to sign the same hash for the same transaction identifier (ID) in order for the signatures to count toward the quorum. The Thresholding Service can provide templates for the clients to sign, and can verify all completed signatures completed by the iOS client. In at least some embodiments, the Thresholding Service verifies signatures with the public components of the users' signing keys, but does not hold the private components of those user signing keys.

Once a threshold has been satisfied, the Thresholding Service will publish the corresponding signature data to the Risk Analysis stage to be further analyzed before sign-off by the Risk Analysis stage, and will serialize the signature data into a payload to be consumed by the HSM signing service. Each additional signature provided to the Thresholding Service and verification can be recorded in the append-only log service. This will provide additional auditing and status updates in addition to the metadata captured in the Thresholding Service's storage, which will be essential for providing consumable updates to user clients.

Maintaining Quorum Liveness

It is assumed that authorized members of a quorum are available to cryptographically sign transactions. Therefore, the quorum should be kept "live"—that is, at any given time, the CCS 1 has reasonable confidence that all potential members of the quorum maintain possession of their secure device keys and can actively participate in a transaction. In certain embodiments, the CCS 1 can do the following to achieve this level of confidence:

1. Have access to the set of user public keys required to fulfill a policy's quorums.
2. Set a liveness threshold for a policy, i.e., the amount of time after which one considers a key to be at risk of unavailability. This can be fixed or related to normal transaction cadence.
3. Require users to periodically sign a proof transaction with their private keys. This can be explicit as a liveness check or hidden/implicit by requiring their key for routine operations such as login.
4. Record the latest live time of any one or more users' keys.
5. Continuously monitor whether any user's live time has exceeded the liveness threshold.
6. Use the above information to prompt the user to prove they still have access to their signing key and/or inform other users that the quorum may be at risk.

Risk Analysis Stage

The Risk Analysis stage 4 can implement an API, called the Risk API, and can further include human review of all transactions and administrative user operations. In some embodiments the Risk API drives the human review system. The Risk API can provide integration with an internal risk dashboard, for human employees of the Cryptoasset Custodian to manually review each transaction.

In certain embodiments, all transactions are manually approved by designated employee(s); all administrative user operations (adding, removing, permission changes) are manually approved by designated Cryptoasset Custodian employee(s); reviewable entities must have passed an auto- mated verification process before requiring risk analysis; reviewable entities must provide robust context about the user approvals, for both human and further automated inspection; and risk approvals and denials are logged in an append-only ledger for auditability.

The Risk API reverifies the appropriate threshold as determined by the Thresholding Service. The Risk API may also handle additional business logic, such as in embodiments where the Thresholding Service is simplified: for example, the Risk API could check for necessary signers if the Thresholding Service only checks for quorums. Other functions described herein can also be moved between modules.

The Risk API can receive contextual data about each user involved in a transaction, to present to a human and/or classification system. This information may include, for example, user(s) who approved the transaction, time of approval(s), location of approval(s), and device/key ID(s) that approved the transaction. This data can be fed into an internal Risk Analysis dashboard, and possibly other automated review systems.

In some embodiments, the Risk API requires human approval from one or more employees of the Cryptoasset Custodian if a transaction passes the manual and automated risk review. To approve, an employee may be required to sign with a cryptographic key if he or she approves the transaction/operation and present the signature to the Risk API for validation. Moreover, there are preferably multiple keys, one per risk reviewer, such that it is logged who performed the review. Preferably it is made easy to rotate a risk-approval key in case of compromise.

Figure 6:
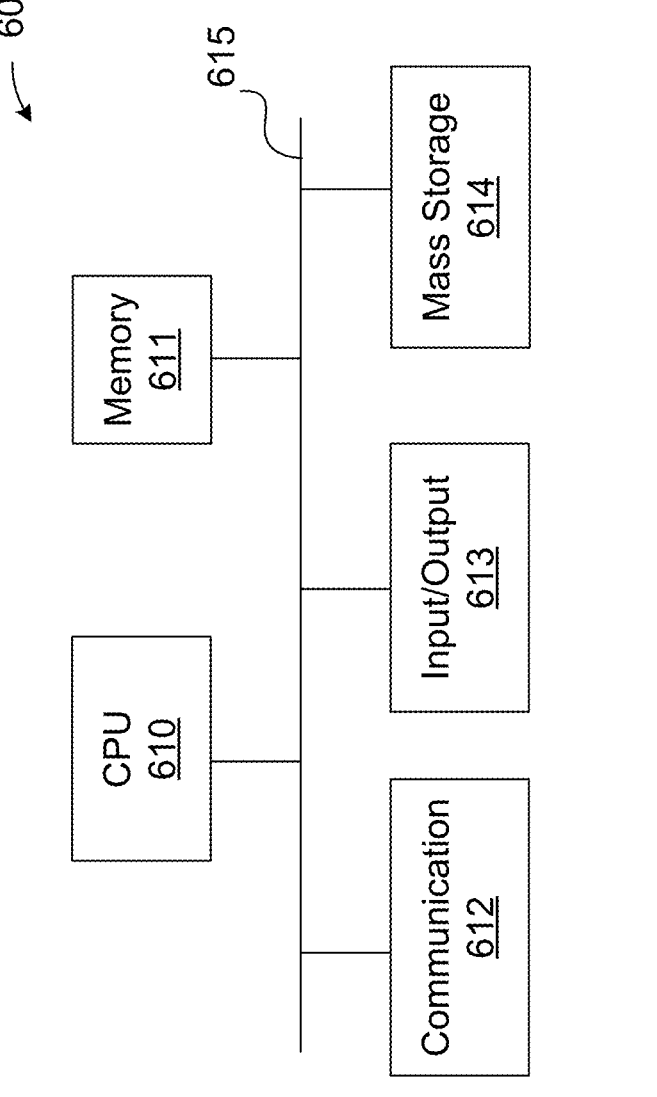
FIG. 6 is a high-level block diagram showing an example of a hardware architecture of a processing system that can be used to implement some or all of the CCS or a user device.

FIG. 6 shows a high-level example of a hardware architecture of a processing system that can be used to implement some or all of the CCS, or (separately) any user device, or both. The CCS can include one or more instances of an architecture such as shown in FIG. 6, where multiple such instances can be coupled to each other via one or more private networks.

The illustrated processing system 600 includes one or more processors, including a CPU 610, one or more memories 611 (at least a portion of which may be used as working memory, e.g., random access memory (RAM)), one or more data communication device(s) 612, one or more input/output (I/O) devices 613, and one or more mass storage devices 614, all coupled to each other through an interconnect 615. The interconnect 615 may be or include one or more conductive traces, buses, point-to-point connections, controllers, adapters and/or other conventional connection devices. Each processor 610 controls part of the operation of the processing device 600 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 611 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 614 can be or include one or more hard drives, digital versatile disks (DVDs), flash memories, or the like. Each memory 611 and/or mass storage 614 can store (individually or collectively) data and instructions that configure the processor(s) 610 to execute operations to implement the techniques described above. Each communication device 612 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 600, each I/O device 613 can be or include a device such as a display (which may include a transparent AR display surface), audio speaker, keyboard, mouse or other pointing device, microphone, camera, etc. Note, however, that such I/O devices may be unnecessary if the processing device 600 is embodied solely as a server computer.

In the case of a user device, a communication device 612 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 612 can be or include, for example, any of the aforementioned types of communication devices, a wired Ethernet adapter, cable modem, DSL modem, or the like, or a combination of such devices.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., RAM or ROM; magnetic disk storage media; optical storage media; flash memory devices; etc.), etc.

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of authorizing a transaction involving a cryptoasset, the method comprising:

receiving, at an online server, a transaction request for a requested transaction involving the cryptoasset from a requestor via a public computer network;

transmitting one or more endorsement requests to one or more mobile devices according to a stored policy in response to receipt of the requested transaction, the one or more mobile devices being associated with one or more users specified in the stored policy as one or more possible members of a quorum for approving the transaction;

receiving, at the online server, one or more endorsement messages from the one or more mobile devices associated with the one or more users in response to transmitting the one or more endorsement requests;

determining, by a hardware security module, that the one or more users have been authenticated according to the stored policy in connection with the one or more endorsement messages associated with the requested transaction;

receiving, by the hardware security module, an indication of the one or more endorsement messages from the one or more mobile devices;

determining, by the hardware security module, whether one or more valid endorsements have been received from the one or more users based on one or more public keys associated with the one or more users for which the one or more endorsement messages have been received;

determining, by the hardware security module, whether a quorum specified by the stored policy has been met based on a comparison by the hardware security module of a number of the one or more valid endorsements that have been received and a number of authorizations that must be received according to the stored policy;

based on the one or more valid endorsements having been received from the one or more users in satisfaction of the quorum, authorizing, by the hardware security module, the requested transaction by using a private key associated with the cryptoasset to sign an approval of the requested transaction, wherein the private key associated with the cryptoasset is generated by the hardware security module for a blockchain address associated with the cryptoasset, and wherein the private key associated with the cryptoasset is inaccessible by devices external to the hardware security module and different from one or more private keys associated with the one or more users; and in response to the transaction request, invoking a risk analysis of the requested transaction, wherein said authorizing the requested transaction is performed based on i) a result of the risk analysis indicating that a risk level associated with the requested transaction satisfies a risk criterion and ii) the one or more valid endorsements having been received from the one or more users in satisfaction of the quorum.

2. A method as recited in claim 1, wherein the stored policy is stored within the hardware security module.

3. A method as recited in claim 1, further comprising using an authentication technique at the online server to authenticate the one or more users in connection with the one or more endorsement messages, the authentication technique including:

causing the one or more mobile devices to prompt the one or more users to record and upload to the online server one or more videos in which the one or more users perform a specified action or speak specified content;

receiving at the online server one or more videos uploaded responsive to the prompt; and analyzing the one or more videos at the online server to authenticate the one or more users by performing at least one of:

verifying a biometric characteristic of the one or more users from the one or more videos, or verifying that the one or more users performed the specified action or spoke the specified content in the video.

4. A method as recited in claim 1, further comprising:

causing the one or more mobile devices to output a deterministic authentication challenge to the one or more users, wherein a content of the deterministic authentication challenge is based on a context of the requested transaction.

5. A method as recited in claim 1, further comprising:

using the hardware security module to generate the private key associated with the cryptoasset as part of a public-private key pair associated with the cryptoasset.

6. A method as recited in claim 1, further comprising:

storing in the hardware security module the public key of a public-private key pair for the one or more mobile devices.

7. A method as recited in claim 6, wherein each received endorsement message has been signed by a corresponding mobile device with a respective private key of the public-private key pair associated with the corresponding mobile device.

8. A method as recited in claim 6, further comprising:

providing a data package to the hardware security module prior to said authorizing the requested transaction, the data package including data indicative of the quorum and the respective public key associated with each of the one or more mobile devices.

9. A method as recited in claim 1, wherein the hardware security module has no direct connection to any public computer network.

10. A method as recited in claim 1, further comprising:

storing, in the hardware security module, the private key associated with the cryptoasset, the private key being part of a public-private key pair associated with the cryptoasset.

11. A method as recited in claim 1, wherein the one or more endorsement requests transmitted to the one or more mobile devices are configured to cause each of the one or more mobile devices to prompt a corresponding user to endorse the requested transaction.

12. A method as recited in claim 1, wherein the determining whether the one or more valid endorsements have been received further comprises determining whether each of the one or more endorsement messages generated at a corresponding mobile device has been signed using a private key stored in a secure storage of the corresponding mobile device.

13. A method as recited in claim 1, further comprising:

transmitting to the hardware security module a data package that includes data specifying the policy, including the quorum, and the public key associated with each of the one or more mobile devices.

14. A system for authorizing a transaction involving a cryptoasset, the system comprising:

one or more processors; and one or more non-transitory computer readable media storing instructions which, when executed by the one or more processors, cause the one or more processors to perform operations comprising:

receiving, at an online server, a transaction request for a requested transaction involving the cryptoasset from a requestor via a public computer network;

transmitting one or more endorsement requests to one more mobile devices according to a stored policy in response to receipt of the requested transaction, the one or more mobile devices being associated with one or more users specified in the stored policy as one or more possible members of a quorum for approving the transaction;

receiving, at the online server, one or more endorsement messages from the one or more mobile devices associated with the one or more users in response to transmitting the one or more endorsement requests;

determining, by a hardware security module, that the one or more users have been authenticated according to the stored policy in connection with the one or more endorsement messages associated with the requested transaction;

receiving, by the hardware security module, an indication of the one or more endorsement messages from the one or more mobile devices;

determining, by the hardware security module, whether one or more valid endorsements have been received from the one or more users based on one or more public keys associated with the one or more users for which the one or more endorsement messages have been received;

determining, by the hardware security module, whether a quorum specified by the stored policy has been met based on a comparison by the hardware security module of a number of the one or more valid endorsements that have been received and a number of authorizations that must be received according to the stored policy;

based on the one or more valid endorsements having been received from the one or more users in satisfaction of the quorum, authorizing, by the hardware security module, the requested transaction by using a private key associated with the cryptoasset to sign an approval of the requested transaction, wherein the private key associated with the cryptoasset is generated by the hardware security module for a blockchain address associated with the cryptoasset, and wherein the private key associated with the cryptoasset is inaccessible by devices external to the hardware security module and different from one or more private keys associated with the one or more users; and in response to the transaction request, invoking a risk analysis of the requested transaction, wherein said authorizing the requested transaction is performed based on i) a result of the risk analysis indicating that a risk level associated with the requested transaction satisfies a risk criterion and ii) the one or more valid endorsements having been received from the one or more users in satisfaction of the quorum.

15. A digital asset custodial system comprising:

an online server configured to:

receive a requested transaction relating to a digital asset from a requestor via a public computer network;

transmit one or more endorsement requests to one or more mobile devices according to a stored policy in response to receipt of the requested transaction, the one or more mobile devices being associated with one or more users specified in the policy as possible members of a quorum for approving the transaction;

receive one or more endorsement messages from the one or more mobile devices in response to transmitting the one or more endorsement requests; and determine that the one or more users have been authenticated in connection with the one or more endorsement messages associated with the requested transaction;

in response to the receiving the requested transaction, invoke a risk analysis of the requested transaction, wherein authorizing the requested transaction is performed based on i) a result of the risk analysis indicating that a risk level associated with the requested transaction satisfies a risk criterion and ii) one or more valid endorsements having been received from the one or more users in satisfaction of the quorum; and a hardware security module configured to:

determine whether one or more valid endorsements have been received from the one or more users based on one or more public keys associated with the one or more users for which the one or more endorsement messages have been received;

determine whether the quorum specified by the stored policy has been met based on a comparison of a number of the one or more valid endorsements that have been received and a number of authorizations that must be received according to the stored policy; and authorize the transaction by signing an approval of the requested transaction using a private key associated with the digital asset based on the one or more valid endorsements of the requested transaction having been received from the one or more users in satisfaction of the quorum, wherein the private key associated with the digital asset is generated by the hardware security module for a blockchain address associated with the digital asset, and wherein the private key associated with the digital asset is inaccessible by devices external to the hardware security module and different from one or more private keys associated with the one or more users.

16. A digital asset custodial system as recited in claim 15, further comprising a relay server to isolate the hardware security module from an Internet.

17. A digital asset custodial system as recited in claim 15, further comprising a risk analysis module to assign a risk score to the requested transaction.

18. A digital asset custodial system as recited in claim 15, wherein each of the one or more mobile devices is configured to prompt a corresponding user to endorse the requested transaction based on a respective endorsement request.

19. A digital asset custodial system as recited in claim 15, wherein the hardware security module is further configured to:

generate the private key associated with the digital asset as part of a public- private key pair associated with the digital asset;

provide a public key of the public-private key pair associated with the digital asset to a computer system that is external to the hardware security module; and maintain the private key of the public-private key pair associated with the digital asset in a storage within the hardware security module and prevent the private key of the public-private key pair associated with the digital asset from being read by any entity that is external to the hardware security module.

20. A digital asset custodial system as recited in claim 15, wherein the online server is further configured to use a biometric authentication technique to authenticate the one or more users in connection with the one or more endorsement requests.

21. A digital asset custodial system as recited in claim 15, further configured to authenticate the one or more users in connection with the endorsements by:

causing the one or more mobile devices to prompt the one or more users to record and upload to the online server one or more videos in which the one or more users perform a specified action or speak specified content;

receiving the one or more videos uploaded responsive to the prompt; and analyzing the one or more videos to authenticate the one or more users by performing at least one of:

verifying a biometric characteristic of the one or more users from the one or more videos, or verifying that the one or more users performed the specified action or spoke the specified content in the one or more videos.

22. A digital asset custodial system as recited in claim 15, and configured to cause the one or more mobile devices to output a deterministic authentication challenge to the one or more users, wherein a content of the deterministic authentication challenge is based on a context of the requested transaction.

23. A method as recited in claim 1, further comprising receiving, by the hardware security module, an operation description, wherein said determining whether one or more valid endorsements have been received from the one or more users comprises:

determining, by the hardware security module, whether each of the one or more users is in an organization specified in the operation description;

determining, by the hardware security module, whether each of the one or more endorsement messages is signed using a correct public key; and determining, by the hardware security module, whether each of the one or more endorsements messages approves the requested transaction.

24. A digital asset custodial system as recited in claim 15, wherein the hardware security module is configured to store, in an internal storage:

the stored policy, which comprises one policy for each action for each possible action;

an identifier of each user specified in the stored policy as a possible member of the quorum for approving the transaction;

an identifier of an organization to which each user specified in the stored policy belongs; and a public key of the organization.

* * * * *